United States Patent [19]

Van Mill

[11] Patent Number: 4,926,617
[45] Date of Patent: May 22, 1990

[54] APPARATUS FOR WRAPPING ROUND BALES

[75] Inventor: Michael D. Van Mill, Shell Rock, Iowa

[73] Assignee: Unverferth Manufacturing Co., Inc., Kalida, Ohio

[21] Appl. No.: 300,959

[22] Filed: Jan. 23, 1989

[51] Int. Cl.⁵ ............................................. B65B 11/04
[52] U.S. Cl. .......................................... 53/587; 53/211
[58] Field of Search ................. 53/399, 118, 211, 556, 53/587, 588

[56] References Cited

U.S. PATENT DOCUMENTS

| | | | |
|---|---|---|---|
| 3,756,003 | 9/1973 | Divine | 56/344 |
| 3,863,425 | 2/1975 | Edwards | 53/211 |
| 3,979,077 | 9/1976 | Dalman | 241/101.7 |
| 4,054,018 | 10/1977 | Neukom | 53/124 B |
| 4,337,805 | 7/1982 | Johnson et al. | 141/71 |
| 4,343,132 | 8/1982 | Lawless, Jr. | 53/399 |
| 4,362,001 | 12/1982 | Cockerham, Jr. | 53/587 |
| 4,409,776 | 10/1983 | Usui | 53/399 |
| 4,484,606 | 11/1984 | Kosters | 141/114 |
| 4,567,820 | 2/1986 | Munsell | 100/65 |
| 4,594,836 | 6/1986 | Good | 53/459 |
| 4,606,172 | 8/1986 | Miller | 53/399 |
| 4,662,151 | 5/1987 | Mathes et al. | 53/587 |
| 4,672,794 | 6/1987 | Good | 53/440 |
| 4,827,700 | 5/1989 | Rampe | 53/587 |

FOREIGN PATENT DOCUMENTS

| | | | |
|---|---|---|---|
| 2705101 | 8/1978 | Fed. Rep. of Germany | 53/118 |
| 2191752 | 12/1987 | United Kingdom | 53/587 |

OTHER PUBLICATIONS

Unverferth Manufacturing Co., Inc., Round-About Universal Hay Tool, 1987, U.S.A.

Primary Examiner—John Sipos
Attorney, Agent, or Firm—Marshall & Melhorn

[57] ABSTRACT

An apparatus for wrapping round hay bales includes a load supporting frame having means for mounting to a three-point hitch and a generally horizontally extending dispenser arm. An elongated spindle is rotatably mounted on the frame for engagement with a round hay bale along its longitudinal axis. A spinner plate is also rotatably mounted on the frame coaxially with the spindle and includes prongs for engaging an end of the hay bale. A hydraulic motor is provided for rotating the spinner plate which in turn rotates the hay bale on the spindle. The motor also moves a sheet material dispenser assembly along the dispenser arm at a predetermined rate to helically wrap the material on the exterior of the bale.

16 Claims, 3 Drawing Sheets ic beam 25. Attached to the upper surface of the lower beam 16

APPARATUS FOR WRAPPING ROUND BALES

BACKGROUND OF THE INVENTION

The present invention relates generally to an apparatus for wrapping round hay bales and, in particular, to an apparatus for helical wrapping round hay bales in a plastic film.

There are many prior art devices available for forming hay into round bales, moving the bales, and unrolling the bales when desired. The bales are rather large in size and can weight a few thousand pounds each. Since these bales are difficult to move and require a large amount of storage space, they typically are stored outside. Thus, the bales are exposed to the elements and tend to loose nutrients which would have been beneficial to the animals utilizing the hay for feed.

One method of preventing loss of nutrients is to wrap the bale in a plastic film. U.S. Pat. No. 4,594,836 discloses an apparatus and method for loading plastic tubing with bales. A removably mounted bracket delivers plastic tubing for the roll over one of opposite open ends of a vertically positioned, pivotally mounted drum. When the entire roll of plastic tubing is gathered over the drum outer surface and tied over one of the drum's opposite open ends, the drum is then pivoted to a horizontal operating position with the opposite open end facing a bale engaged by a carriage. The engaged bale activates a hydraulic cylinder to force a telescoping ram against the opposite face of the carriage. This causes the engaged bale to enter the drum and load into the plastic tubing. A drop gate extension on the carriage ejects the last bale from the drum to clear the apparatus. This apparatus has the disadvantage that the bales must be transported to it by a truck or other vehicle and the bales must then be stored in one long plastic tube.

SUMMARY OF THE INVENTION

The present invention concerns an apparatus for wrapping round hay bales in a plastic film. The apparatus can be mounted on a standard three-point hitch of a farm tractor thereby rendering the apparatus mobile. Furthermore, the apparatus only requires one person, for example the tractor operator, to complete the entire wrapping operation.

An elongated spindle extends through the center of a spinner plate for engaging and supporting a round bale of hay. The spinner plate includes a plurality of prongs radially displaced from the center of the plate for engaging an end of the hay bale whereby when the bale is lifted from the ground and the spinner plate is rotated, the bale rotates on the spindle. A source of hydraulic fluid is provided by the tractor to actuate a drive motor to rotate the spinner plate.

A horizontally extending arm has a plastic film dispensing roll mounted for movement along the arm to maintain the roll parallel to the bale. The operator attaches a free end of a continuous sheet of plastic film on the roll to an outer end of the round bale and then actuates the drive motor to rotate the bale in a direction to roll the film on the outer cylindrical surface of the bale in a helical pattern. The spinner plate drive also moves the roll along the arm at a predetermined rate thereby guiding the application of the film to the hay bale.

DESCRIPTION OF THE PREFERRED EMBODIMENT

Figure 1:
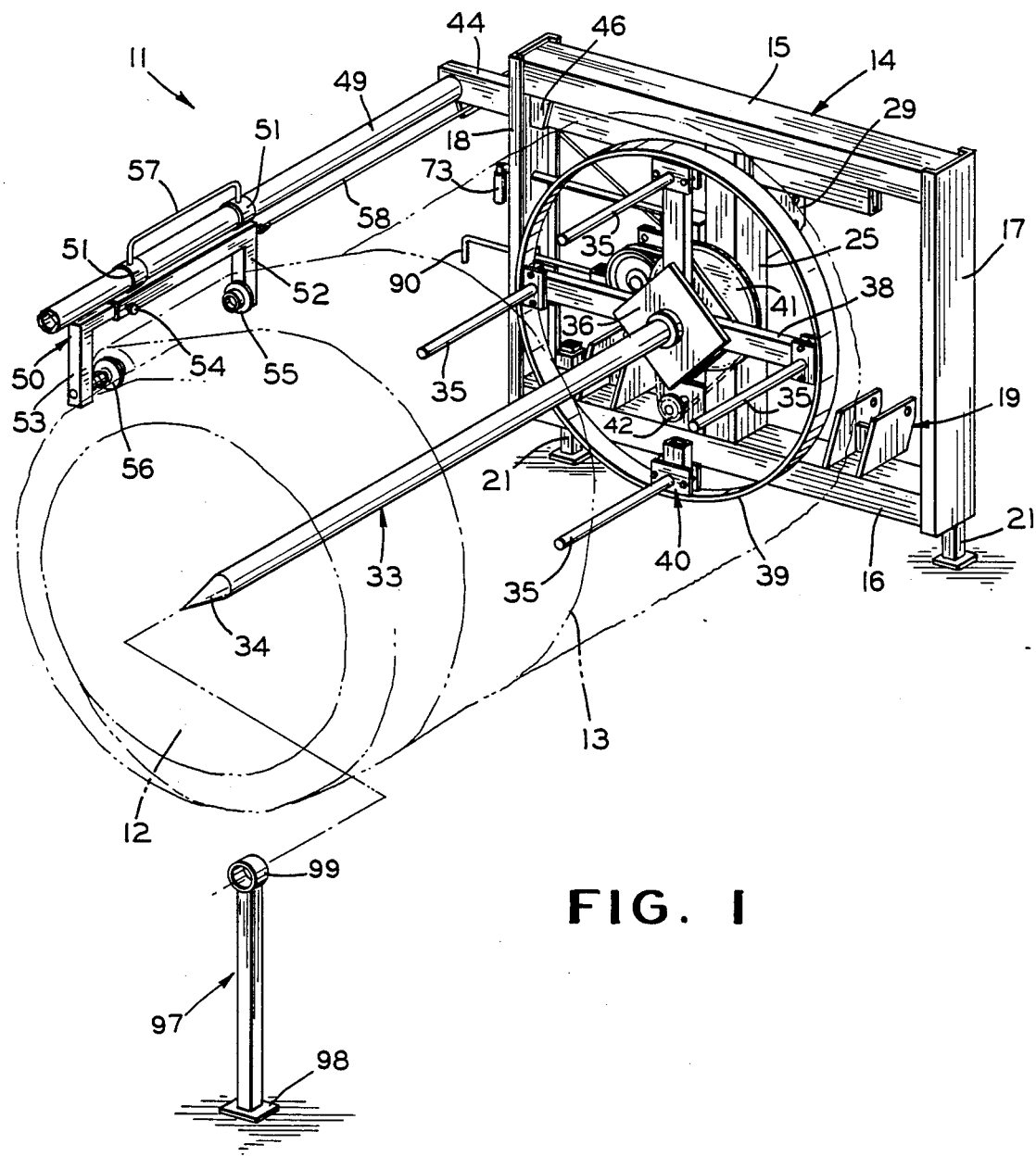
FIG. 1 is a perspective view of a round hay bale wrapping apparatus in accordance with the present invention.
Figures 2, 3:
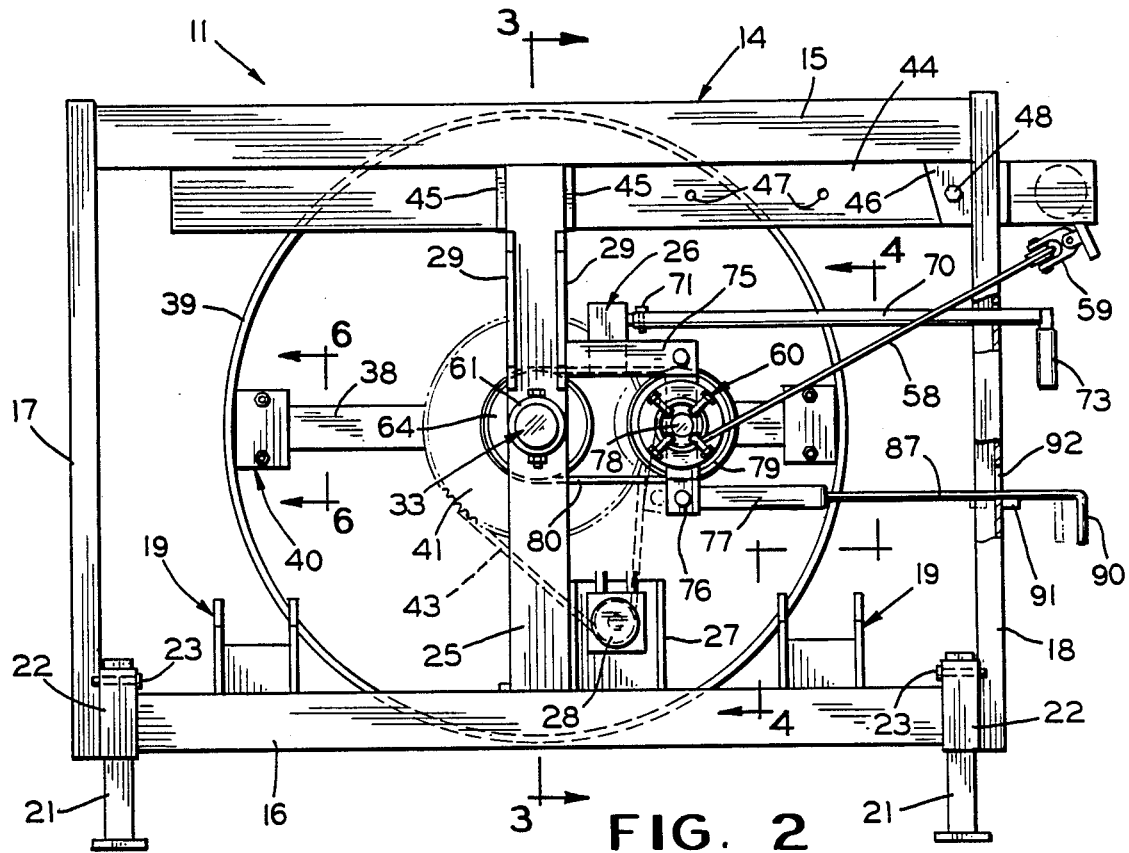
FIG. 2 is an enlarged rear elevational view of the apparatus in FIG. 1.
FIG. 3 is a cross sectional view of the apparatus taken along the line 3—3 in FIG. 2.

A round hay bale wrapping apparatus 11, in accordance with the present invention, is shown in FIG. 1. A round bale of hay 12 and a continuous sheet of wrapping material such as plastic film 13 are shown in phantom so as not to obscure the details of the apparatus 11. Referring to FIG. 1 through FIG. 3, the apparatus 11 includes a generally rectangular frame 14 defined by generally horizontally extending spaced apart upper beam 15 and lower beam 16 attached at opposite ends to generally vertically extending right side beam 17 and left side beam 18. Typically, the beams 15 and 16 are box beams and the beams 17 and 18 are U-shaped channel wherein the beams 15 and 16 are located between the flanges on the beams 17 and 18. The beams 15 through 18 can be attached together by any suitable means such as welding.

Figure 5:
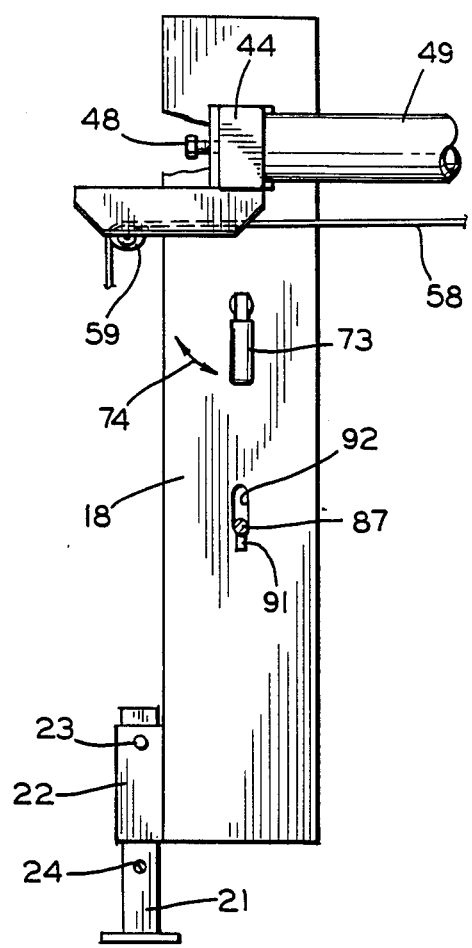
FIG. 5 is a left side elevational view of the apparatus in FIG. 1.

A pair of lower mounting brackets 19 are attached to the upper surface and spaced inwardly at either end of the beam 16. Each of the brackets 19 includes apertures 20 for cooperation with pins (not shown) for use in mounting or coupling the apparatus 11 to the lower two points on a standard three-point hitch at the rear of a tractor or similar vehicle. A pair of ground engaging legs 21 are each vertically movable in associated sleeves 22 attached at opposite ends of the beam 16. A pair of locking pins 23 extend through apertures formed in an upper portion of the sleeves and through selected ones of a pair of cooperating apertures 24 (FIG. 5) formed in the legs 21. Thus, the legs 21 can be maintained in a raised position when the apparatus 11 is attached to a vehicle and lowered to a ground engaging position, as shown in FIG. 2 and FIG. 5, when the apparatus is to be stored.

A mounting beam 25 in the form of a box beam is positioned midway between the side beams 17 and 18 and extends generally vertically between and is attached to the upper beam 15 and the lower beam 16. Attached to the mounting beam 25 is a control valve 26. Attached to the upper surface of the lower beam 16 adjacent the left side of the mounting beam 25 is a mounting bracket 27 retaining a hydraulic drive motor 28. The valve 26 and the motor 28 will be discussed in more detail below. A pair of generally vertically extending mounting plates 29 are attached to an upper portion of the rearwardly facing surface of the mounting beam 25. The plates 29 have a plurality of apertures 30 formed therein for attachment to the third point on the three-point hitch.

A bearing support 31 is also attached to the rearwardly facing surface of the mounting beam 25 approximately midway between the upper beam 15 and the lower beam 16. Another bearing support 32 is attached to the forwardly facing surface of the beam 25 and is aligned with the support 31 and apertures formed in the walls of the beam 25. A spindle 33 has one end located in the bearing supports 31 and 32 and extends through the mounting beam 25 terminating in a forward extending pointed end 34.

A plurality of prongs 35 are radially spaced from a center of a spinner plate 36. The spinner plate 36 is formed from a pair of generally square, spaced apart hub plates 37. Attached between and at the corners of the hub plates 37 are the inner ends of four radially extending spokes 38. The outer ends of the spokes 38 are attached to an inwardly facing surface of a ring 39. The spindle 33 extends through the center of the spinner plate 36 and the prongs 35 extend generally parallel to the spindle 33. Each of the prongs 35 is attached to a corresponding one of the spokes 38 by a bracket which will be discussed in more detail in connection with FIG. 6. The spinner plate 36 is attached to a hub of a large sprocket 41. A small sprocket 42 is coupled to the output shaft of the hydraulic drive motor 28 for rotation thereby. A chain 43 extends around the small sprocket 42 and the large sprocket 41 such that when the hydraulic drive motor 28 is actuated, the spinner plate 36 and the prongs 35 are rotated.

A generally horizontally extending extension beam 44 has one end which telescopes into the frame 14 below the upper beam 15 through apertures formed in the left side beam 18 and the mounting beam 25. The beam 44 is guided by vertically extending flanges 45 on opposite sides of the apertures in the mounting beam 25 and by a pair of vertically extending plates 46 extending through the apertures in the side beam 18. Apertures 47 formed in the rearwardly facing surface of the beam 44 can be engaged by a pin or bolt 48 retained in the rearward one of the plates 46 to maintain the extension beam 44 in the storage/travel position shown or in a selected one of a plurality of extended positions corresponding to the diameter of the hay bale to be wrapped.

At the outer end of the extension beam 44 there is attached a generally horizontally extending dispensing arm 49 extending generally parallel to the longitudinal axis of the spindle 33. A plastic film dispenser assembly 50 is slidably attached to the dispensing arm 49 for retaining a roll of the plastic film 13. The dispensing arm 49 is typically tubular and has a circular cross-section. The arm 49 extends through a pair of spaced apart sleeves 51 which are free to move along the arm 49 from the end attached to the extension beam 44 to the outer end which extends outwardly a distance corresponding to the axial length of the longest bale of hay to be wrapped. The sleeves 51 are attached to an upper surface of a first generally L-shaped bracket 52. A second generally L-shaped bracket 53 telescopes into the bracket 52 to form an inverted generally U-shaped roll retainer. A threaded fastener 54 extends through a wall of the bracket 52 and engages the bracket 53 to retain the brackets 52 and 53 at a selected spacing. A hub 55 is rotatably mounted on a lower end of the downwardly extending leg of the bracket 52 to engage an open end of a tube on which the sheet plastic is rolled. A spring loaded hub 56 is rotatably mounted at the lower end of the downwardly extending leg of the bracket 53 to engage the opposite end of the tube. Thus, the film dispenser assembly 50 can be adjusted in width to apply a predetermined amount of tension to the plastic roll as required to properly wrap the hay bale. A handle 57 extends between the sleeves 51 for use in manually locating the dispenser assembly 50 along the arm 49. One end of a cable 58 is attached to the bracket 52 and extends along the arm 49 and through a pulley 59 mounted at the outer end of the extension beam 44. The pulley 59 changes the direction of the cable toward a cable winding means 60 which will be discussed in more detail with reference to FIG. 4.

As stated above, the spindle 33 is rotatably mounted in the bearing supports 31 and 32 and extends through the spinner plate 36 and the large sprocket 41 which are free to rotate on the spindle 33. A collar 61 is removably attached to the rearward end of the spindle 33 adjacent the support 31 to prevent the spindle 33 from moving in a direction parallel to its longitudinal axis toward the front of the wrapping apparatus 11. A second collar 62 is attached to the spindle 33 adjacent the front side of the spinner plate 36 to prevent the spindle from moving in the opposite direction. However, the collar 61 can be removed to allow the spindle 33 to be withdrawn from the apparatus 11 through the spinner plate 36.

The spindle 33 extends through a tubular spacer 63 which attaches a V-belt drive pulley 64 to the large sprocket 41. Thus, the spinner plate 36, the large sprocket 41 and the pulley 64 are connected together for co-rotation about the spindle 33 by the hydraulic motor 28 and the spindle 33 floats in the supports 31 and 32. When the spindle 33 is inserted into a bale of hay and the prongs 35 engage the bale of hay, the spindle 33 may be frictionally driven in rotation by the bale of hay as the spinner plate 36 rotates the bale of hay.

Figure 4:
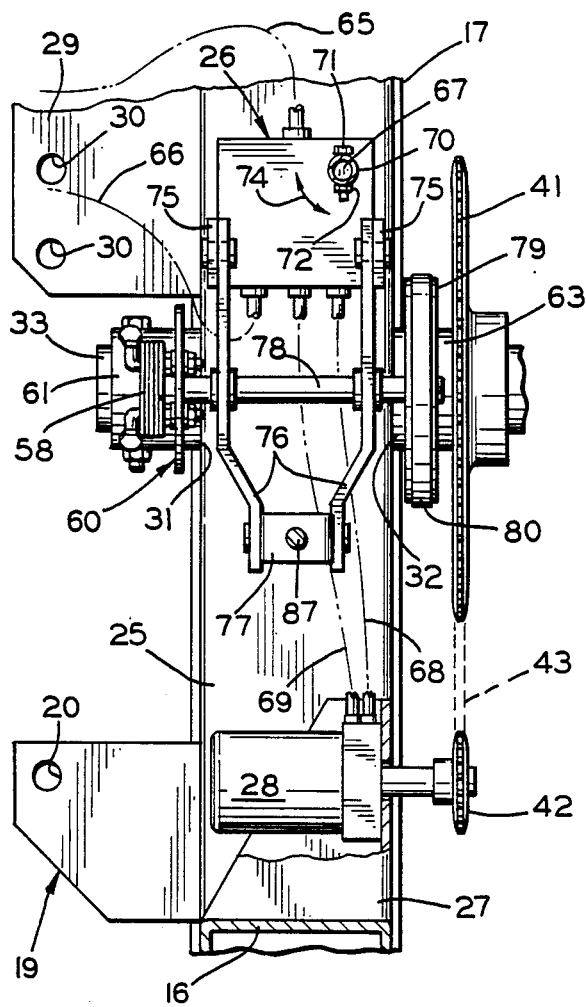
FIG. 4 is a cross-sectional view of the apparatus taken along the line 4—4 in FIG. 2 and enlarged.

Referring to FIG. 2 and FIG. 4, there is shown the hydraulic actuating system for the apparatus 11. The central portion of each hydraulic line is shown in phantom so as not to obscure other elements of the apparatus 11. A hydraulic supply line 65 and a hydraulic return line 66 are connected to a source of hydraulic fluid under pressure (not shown) such as a tractor. The lines 65 and 66 are connected to the hand control valve 26 mounted on the beam 25. The valve 26 has a rotary control shaft 67 for controlling the application of hydraulic fluid through a pair of hydraulic lines 68 and 69 connected between the valve 26 and the hydraulic motor 28. A tubular actuating rod 70 is open at one end to accept the shaft and is coupled thereto by any suitable means such as a bolt 71 passing through apertures in the shaft 67 and the and the rod 70 and retained by a nut 72. The opposite end of the rod 70 passes through an aperture in the side beam 18 and is attached to a downwardly extending handle 73 (FIG. 2). In the position shown, the valve blocks the application of hydraulic fluid through the hydraulic lines 68 and 69. By rotating the handle 73 and the rod 70 in a clockwise direction as shown by an arrow 74 (FIG. 4 and FIG. 5), the lines 68 and 69 are connected to the source of hydraulic fluid through the valve 26 to actuate the hydraulic drive motor 28.

Figure 7:
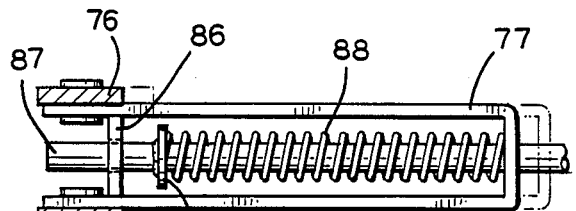
FIG. 7 is an enlarged top plan view of the drive mechanism tensioning device of the apparatus in FIG. 1.

There is shown in FIG. 2, FIG. 4 and FIG. 7 the drive mechanism tensioning device of the apparatus 11. A pair of mounting brackets 75 are attached at an inner end to the beam 25 on opposite sides of the valve 26 and extend in a generally horizontal direction toward the side beam 18. An upper end of each of a pair of lever arms 76 is rotatably attached to an outer end of a corresponding one of the brackets 75. The lever arms 76 extend downwardly and inwardly and are rotatably attached at lower ends to opposite legs of a generally U-shaped spring retainer 77. A generally horizontally extending shaft 78 is rotatably mounted approximately midway between the ends of the arms 76. A V-belt driven pulley 79 is attached at a forward end of the shaft 78 and is coupled to the drive pulley 64 by a V-belt 80.

Figure 8:
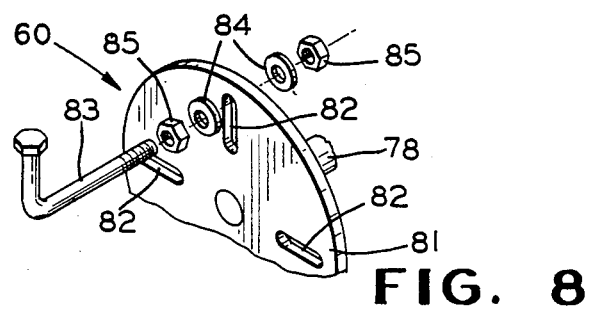
FIG. 8 is an enlarged fragmentary perspective view of the roll dispenser drive of the apparatus in FIG. 1.

The cable winding means 60 is attached to the rearward end of the shaft 78. As best shown in FIG. 8, the winding means includes a generally circular mounting plate 81 having a central aperture for the shaft 78. Four equally spaced, radially extending slots 82 are formed adjacent the periphery of the plate 81 each for accepting a threaded end of an associated one of four winding posts 83. The posts 83 can be formed by bending a bolt at a right angle. The threaded ends of the posts are retained in the slots by a pair of washers 84 and a pair of nuts 85 which permit selective movement of the posts radially. The cable 58 can be attached to the winding means by forming a loop at the end of the cable for accepting one of the posts 83. The position of the posts 83 in the slots 82 determines the speed of winding and thus the speed of travel of the film dispenser assembly 50 along the arm 49 to compensate for different widths of plastic.

As shown in FIG. 7, an end plate 86 is attached between the facing inner surfaces of the legs of the spring retainer 77 adjacent the lecer arms 76. An actuating rod 87 has an inner end which extends through apertures formed in the closed end of the retainer 77 and the end plate 86. The rod extends through a spring 88 which is trapped between the closed end of the retainer and a stop 89 attached to the rod adjacent the end plate 86. As shown in FIG. 2, the outer end of the rod is formed into a downwardly extending handle 90 and a downwardly extending stop 91 is attached to the rod adjacent the side beam 18 where the rod extends through a vertically extending aperture 92 formed in the beam 18. In the position of the rod 87 shown in solid line in FIG. 2, the arms 76 have been rotated in a counter clockwise direction about the connection to the brackets 75 thereby applying tension to the V-belt 80 such that rotation of the pulley 64 will rotate the pulley 79 and the winding means 60. The rod 87 can be lifted to permit the stop 91 to pass through the aperture 92 and assume the position shown in phantom line where the V-belt drive is disengaged. In FIG. 7, the disengaged position is shown in solid line. The rod 87 is raised to permit the stop to pass through the aperture moving the retainer 77 to the position shown in phantom line. The spring 88 is partially compressed to apply tension to the V-belt.

Figure 6:
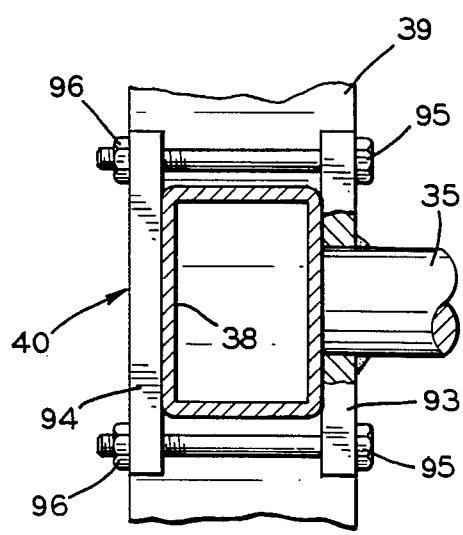
FIG. 6 is a cross sectional view of the apparatus taken along the line 6—6 in FIG. 2.

Each of the prongs 35 is radially adjustable as shown in FIG. 6. The bracket 40 includes a pair of clamping plates, a front clamping plate 93 to which the prong 35 is attached and a rear clamping plate 94. A pair of bolts 95 extend through both plates and are secured by a pair of nuts 96. The plates 93 and 94 are positioned on opposite sides of the spoke 38. When the nuts 96 are loosened, the bracket 40 can be moved along the spoke 38 to any desired position.

The method of operation of the hay bale wrapping apparatus 11 will now be described. As shown in FIG. 1, a spindle stand 97 has a ground engaging base 98 at a lower end and a tube 99 mounted at an upper end. The longitudinal axis of the tube 99 is coextensive with the longitudinal axis of the spindle 33 such that the tube 99 receives the spindle to form a three-point support with the legs 21. When it is desired to use the apparatus 11, the mounting brackets 19 and 29 are attached to a three-point hitch mounted on the rear of a tractor or similar vehicle. The apparatus 11 can also be mounted on a front loader attachment. In either case however, the apparatus 11 is maintained in a position wherein the longitudinal axis of the spindle 33 is generally parallel to the ground. The spindle stand 97 is removed and the legs 21 are raised to the operating position.

The apparatus 11 can be raised and lowered by the tractor as required to locate the spindle 33 at the center of any diameter bale of hay. The prongs 35 are adjusted inwardly or outwardly depending on the diameter of the bale and whether it is desired to unwrap or unwind the bale. The beam 44 is also extended from the storage position. The vehicle is backed toward the bale of hay such that the spindle 33 enters the bale along the longitudinal axis of the bale and the prongs 35 enter the end of the bale closest to the tractor. The bale can be raised off of the ground for rotation during wrapping or unwrapping. After the bale has been wrapped, it can remain on the apparatus 11 for transportation to another location, for stacking, or for loading on any type of conveyance system.

The plastic film 13 typically is available in standard widths wrapped around a hollow spindle. The adjusting screw 54 is utilized to permit the arms 52 and 53 to be spaced apart the correct distance to accept the roll of plastic film. One end of the hollow spindle is inserted over the hub 55 attached to the leg 52. The hub 56 attached to the leg 53 is depressed against its spring to permit the other end of the spindle to be aligned and then the hub 56 is released for engagement with the spindle.

Once the operator has inserted the spindle 33 into the bale 12, the operator leaves the tractor and moves the dispenser assembly 50 outwardly on the arm 49 adjacent the outer end of the bale 12. The operator attaches the free end of the plastic film 13 to the end of the bale adjacent the dispenser assembly 50. The operator adjusts positions of the winding posts 83 in accordance with the diameter of the bale and takes up the slack in the cable 58. The operator positions himself at the controls for the apparatus 11 and actuates the drive motor 28 by rotating the control handle 73. Typically, the bale 12 is rotated in a clockwise direction as viewed from the perspective of FIG. 1. After the end of the bale 12 has been wrapped, the handle 90 is lifted and pulled out to engage the cable winding means 60 thereby moving the dispenser assembly 50 at a relatively slow rate of speed to permit easy control of plastic thickness. The wrap thickness is controlled through controlling the speed of the rotation of the bale and/or stopping the rotation of the winding means 60 at any desired points. The lengths of the arm 49 and the beam 44 are such that bales having a wide range of diameters and lengths can be accommodated.

In accordance with the provisions of the patent statutes the present invention has been described in what is considered to represent its preferred embodiment. However, it should be noted that the invention can be practiced otherwise than as specifically illustrated and described without departing from its spirit or scope.

What is claimed is:

1. An apparatus for wrapping a round hay bale with a continuous sheet of wrapping material, comprising:

a load supporting frame;

mounting bracket means attached to said frame and adapted to be coupled to a vehicle;

a spindle rotatably mounted on said frame and adapted to be inserted along a longitudinal axis of a round hay bale;

spinner plate means rotatably mounted on said frame and adapted to engage a round hay bale on said spindle for rotating the bale about its longitudinal axis;

a dispenser arm attached to said frame and extending generally parallel to said spindle;

a dispenser assembly slidably attached to said arm and adapted to retain a source of a continuous sheet of wrapping material;

control means coupled to said spinner plate for rotating said spinner plate and moving said dispenser assembly along said dispenser arm to wrap said sheet material around the bale; and a cable winding means rotatably attached to said frame, a cable connected between said dispenser assembly and said winding means, and means for selectively coupling said winding means to said control means for rotating said winding means and moving said dispenser assembly.

2. The apparatus according to claim 1 wherein said mounting bracket includes means for coupling to a three-point hitch on the vehicle.

3. The apparatus according to claim 1 wherein said frame includes an extension beam attached to said dispenser arm for positioning said dispenser arm relative to said spindle for accommodating different diameter bales.

4. The apparatus according to claim 3 including means for selectively maintaining said extension beam at a plurality of predetermined positions with respect to said spindle.

5. The apparatus according to claim 1 wherein said winding means includes means for adjusting the rate of movement of said dispenser assembly along said dispenser arm.

6. The apparatus according to claim 5 wherein said means for adjusting the rate of movement includes a plurality of winding posts radially adjustable relative to an axis of rotation of said winding means.

7. The apparatus according to claim 1 wherein said control means includes a hydraulic motor coupled to said spinner means for rotating said spinner means, and a control valve connected to said motor and adapted to be connected to a source of hydraulic power on the vehicle.

8. The apparatus according to claim 1 wherein said spinner means includes a plurality of prongs extending generally parallel to said spindle and attached to bracket means for selectively positioning said prongs radially relative to said spindle.

9. The apparatus according to claim 8 wherein said dispenser assembly includes a pair of L-shaped brackets each having one leg telescopically engaged together and another leg for retaining one end of a wrapping material spindle.

10. The apparatus according to claim 1 wherein said dispenser assembly includes means for applying tension to the wrapping material as it is being unrolled.

11. The apparatus according to claim 1 including a pair of ground engaging legs attached to said frame and a ground engaging spindle stand for supporting said spindle.

12. An apparatus for wrapping a round bale of hay with a continuous sheet of wrapping material, comprising:

a load supporting frame;

a three-point mounting bracket attached to said load supporting frame and adapted to be coupled to a three-point hitch on a vehicle having a source of hydraulic power;

a spinner plate rotatably mounted on said frame and having a plurality of prongs for engaging an end of a round bale of hay;

a hydraulic motor attached to said frame and coupled to drive said spinner plate in rotation;

a spindle rotatably mounted on said frame and extending through said spinner plate, said spindle adapted to be inserted along a longitudinal axis of the bale;

a dispenser arm attached at one end to said frame and extending generally parallel to said spindle;

a dispenser assembly slidably attached to said arm and coupled to be driven by said motor and adapted to retain a roll of a continuous sheet of wrapping material;

hydraulic control means connected to said motor and adapted to be connected to the source of hydraulic power for simultaneously controlling the rotation of said spinner plate and the movement of said dispenser assembly along said arm; and a cable winding means rotatably attached to said frame, a cable connected between said dispenser assembly and said winding means, and means for selectively coupling said winding means to said hydraulic motor for rotating said winding means and moving said dispenser assembly.

13. The apparatus according to claim 12 including an extension beam slidably attached to said frame at one end and attached to said dispenser arm at an opposite end, a plurality of apertures formed in said extension beam, and pin means retained by said frame for selectively engaging said apertures to position said dispenser arm with respect to said spindle.

14. The apparatus according to claim 12 wherein said spinner plate includes a hub plate, a ring and a plurality of radially extending spokes connecting said hub plate to said ring, and wherein said prongs are each attached to a bracket slidably engaging an associated one of said spokes for selectively radially positioning said prongs with respect to said spindle.

15. The apparatus according to claim 12 including a cable winding means rotatably attached to said frame and having a plurality of winding posts radially adjustable with respect to an axis of rotation, and a cable connected between said dispenser assembly and said winding posts.

16. An apparatus for wrapping a round bale of hay with a continuous sheet of wrapping material, comprising:

a load supporting frame;

a three-point mounting bracket attached to said load supporting frame and adapted to be coupled to a three-point hitch on a vehicle having a source of hydraulic power;

a spinner plate rotatably mounted on said frame and having a centrally located hub plate, a concentric ring, and a plurality of spokes connecting said hub plate with said ring;

a plurality of prongs mounted on brackets slidably engaging associated ones of said spokes for selectively radially positioning said prongs with respect to an axis of rotation of said spinner plate;

a hydraulic motor attached to said frame and coupled to drive said spinner plate in rotation;

a spindle rotatably mounted on said frame and extending through said spinner plate, said spindle adapted to be inserted along a longitudinal axis of the bale;

an extension beam slidably mounted on said frame;

a dispenser arm attached at one end to said extension beam and extending generally parallel to said spindle;

a dispenser assembly slidably mounted on said dispenser arm and adapted to retain a roll of a continuous sheet of wrapping material;

winding means rotatably mounted on said frame and coupled to said hydraulic motor for rotation;

a cable connected between said winding means and said dispenser assembly; and hydraulic control means connected to said motor and adapted to be connected to the source of hydraulic power for controlling the rotation of said spinner plate and the rotation of said winding means for moving said dispenser assembly along said dispenser arm.

* * * * *